United States Patent
Richart et al.

(10) Patent No.: US 12,529,588 B2
(45) Date of Patent: Jan. 20, 2026

(54) FLUID CONSUMPTION MEASUREMENT SYSTEM AND METHOD

(71) Applicant: Cummins Power Generation Inc., Minneapolis, MN (US)

(72) Inventors: Kyle David Richart, Indianapolis, IN (US); Shawn Aaron Rockey, Seymour, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 109 days.

(21) Appl. No.: 17/690,679

(22) Filed: Mar. 9, 2022

(65) Prior Publication Data
US 2023/0288242 A1 Sep. 14, 2023

(51) Int. Cl.
*G01F 7/00* (2006.01)
*G01F 15/00* (2006.01)

(52) U.S. Cl.
CPC .............. *G01F 7/00* (2013.01); *G01F 15/001* (2013.01)

(58) Field of Classification Search
CPC ................................. G01F 7/00; G01F 15/001
USPC .......................................................... 73/196
See application file for complete search history.

(56) References Cited

U.S. PATENT DOCUMENTS

| | | | |
|---|---|---|---|
| 4,338,816 A | 7/1982 | Neff | |
| 4,798,092 A | 1/1989 | Lagergren et al. | |
| 4,845,630 A | 7/1989 | Stephens | |
| 6,301,958 B1 | 10/2001 | Grabher et al. | |
| 2007/0175271 A1 | 8/2007 | Pividori et al. | |
| 2008/0178687 A1 | 7/2008 | Amante et al. | |
| 2017/0227390 A1* | 8/2017 | Zimmer | G01F 1/8436 |
| 2019/0338712 A1* | 11/2019 | Wibberley | F02D 19/082 |

FOREIGN PATENT DOCUMENTS

| | | |
|---|---|---|
| CN | 201 876 282 U | 6/2011 |
| CN | 102692256 A | 9/2012 |
| EP | 1 496 247 A1 | 1/2005 |
| KR | 2020-0053092 A | 5/2020 |
| WO | WO-2005054791 A1 * | 6/2005 ........... G01F 1/8409 |

(Continued)

OTHER PUBLICATIONS

International Search Report and Written Opinion on PCT PCT/US2023/013419 Dtd Jun. 19, 2023, 12 pages.

(Continued)

*Primary Examiner* — Peter J Macchiarolo
*Assistant Examiner* — Rodney T Frank
(74) *Attorney, Agent, or Firm* — Foley & Lardner LLP

(57) ABSTRACT

A fluid measurement system is configured to measure fluid consumption of a vehicle. The fluid measurement system includes a housing coupled to the vehicle and including a supply inlet, a supply outlet, a return inlet, and a return outlet. The system includes a flow rate measurement module having a plurality of flow meters disposed within the housing, including a supply flow meter configured to measure a supply flow rate and disposed between the supply inlet and the supply outlet; and a return flow meter configured to measure a return flow rate and disposed between the return inlet and the return outlet; and a processor configured to calculate, based on the supply flow rate and the return flow rate, a fluid consumption rate, and transmit the fluid consumption rate.

16 Claims, 8 Drawing Sheets

(56) References Cited

FOREIGN PATENT DOCUMENTS

WO    WO-2010/120245 A1    10/2010

OTHER PUBLICATIONS

"Screw Type Flow Meter SVC." Kracht Corp., 2016, http://www.krachtcorp.com/wp-content/uploads/2016/02/SVC_US_02-16_view.pdf.
"Micro Motion F-Series Flow and Density Meters", Micro Motion, Emerson, Product Data Sheet PS-00603, Rev AK, Aug. 2023.
Holykell®, Top 9 Flow Meter Types, Feb. 23, 2022, available at https://www.holykell.com/news/Top_9_Flow_Meter_Types.html (accessed Jul. 11, 2025), 6 pgs.

* cited by examiner

FLUID CONSUMPTION MEASUREMENT SYSTEM AND METHOD

TECHNICAL FIELD

The present disclosure relates generally to fluid consumption measurement systems and methods for a vehicle.

BACKGROUND

Fuel consumption rate is a metric of interest for vehicles, including when a vehicle is in mission. Fuel consumption rate is calculable analytically based on engine test cell data recorded under specific conditions.

SUMMARY

The present disclosure relates to techniques for determining a fuel consumption rate in mission. In particular, such techniques provide for flow rate measurements with the potential for enhanced accuracy. More particularly, the present disclosure allows for fluid consumption rates to be obtained in real time that are indicative of actual use conditions.

In at least one embodiment, a flow rate measurement module for a fluid measurement system includes a supply flow meter configured to receive a supply inlet flow; measure a supply flow rate; and provide a supply outlet flow; a return flow meter configured to receive a return inlet flow; measure a return flow rate; and provide a return outlet flow; and a processor coupled to the supply flow meter and the return flow meter, the processor being configured to determine, from the supply flow meter, the supply flow rate; determine, from the return flow meter, the return flow rate; and determine a fluid consumption rate based on the supply flow rate and the return flow rate.

In some embodiments, the processor calculates the fluid consumption rate in a range of about 5 milliseconds to about 10 milliseconds, inclusive.

In some embodiments, the supply flow meter comprises a first spindle configured to engage with a second spindle, wherein the first spindle and the second spindle are configured to rotate to measure the supply flow rate, and the return flow meter comprises a third spindle configured to engage with a fourth spindle, wherein the third spindle and the fourth spindle are configured to rotate to measure the supply flow rate.

In some embodiments, the supply flow meter is configured to measure the supply flow rate by measuring a volume of the supply inlet flow flowing through the supply flow meter, and the return flow meter is configured to measure the return flow rate by measuring a volume of the return inlet flow flowing through the return flow meter.

In some embodiments, the supply flow meter and the return flow meter are respectively dimensioned to measure flow having a flow rate in a range from an engine minimum fuel flow rate to an engine maximum fuel flow rate.

In some embodiments, the flow rate measurement module further includes a supply inlet flow filter disposed upstream of supply flow meter and configured to filter particulate from the supply inlet flow, and a return inlet flow filter disposed upstream of the return flow meter and configured to filter particulate from the return inlet flow.

In some embodiments, the supply inlet flow filter includes a first screen disposed upstream of the supply flow meter, and the return inlet flow filter includes a second screen disposed upstream of the return flow meter.

In some embodiments, the flow rate measurement module includes a supply flow controller configured to control a supply outlet flow pressure, and a return flow controller configured to control a return outlet flow pressure.

In some embodiments, the supply flow controller is configured to receive the supply flow rate and adjust, based on the supply flow rate, the supply outlet flow pressure, and the return flow controller is configured to receive the return flow rate and adjust, based on the return flow rate, the return outlet flow pressure.

In some embodiments, the supply flow controller and the return flow controller are solenoid valves.

In at least one embodiment, a fluid measurement system is configured to measure fluid consumption of a vehicle and includes a housing coupled to the vehicle, the housing having a supply inlet, a supply outlet, a return inlet, and a return outlet; and a flow rate measurement module including a plurality of flow meters disposed within the housing, wherein the plurality of flow meters includes a supply flow meter configured to measure a supply flow rate and disposed between the supply inlet and the supply outlet, and a return flow meter configured to measure a return flow rate and disposed between the return inlet and the return outlet; and a processor configured to communicate with at least the supply flow meter and the return flow meter and configured to calculate, based on the supply flow rate and the return flow rate, a fluid consumption rate, and transmit the fluid consumption rate during operation of the vehicle.

In some embodiments, the fluid measurement system further includes a supply flow controller disposed between the supply flow meter and the supply outlet; and a return flow controller disposed between the return flow meter and the return outlet, the supply flow controller and the return flow controller being coupled to the processor to control, respectively, a supply flow pressure and a return flow pressure. The supply inlet receives a supply inlet flow from a fluid source; the supply outlet provides a supply outlet flow to an engine; the return inlet receives a return inlet flow from the engine; and the return outlet provides a return outlet flow to the fluid source.

In some embodiments, the supply inlet flow passes through the supply flow meter and rotates a portion of the supply flow meter, and the return inlet flow passes through the return flow meter and rotates a portion of the return flow meter.

In some embodiments, the processor transmits the fluid consumption rate to at least one of an engine control module configured to monitor the fluid consumption rate, and an external monitor configured to display the fluid consumption rate.

In some embodiments, the supply inlet and the supply outlet are dimensioned to have a first diameter, the return inlet and the return outlet are dimensioned to have a second diameter, and the first diameter and the second diameter are respectively dimensioned according to an engine minimum fuel flow rate and an engine maximum fuel flow rate.

In at least one embodiment, a method for calculating a fluid consumption rate of a vehicle using a flow rate measurement module of a fluid measurement system is provided. The fluid measurement system includes a housing provided with a supply inlet, a supply outlet, a return inlet, and a return outlet; and a flow rate measurement module having a plurality of flow meters with at least a supply flow meter and a return flow meter, and a processor. The method includes providing, by the supply inlet, a supply inlet flow to the flow rate measurement module; measuring, by the supply flow meter, a supply flow rate by the supply flow meter; receiving, by the supply outlet, a supply outlet flow from the supply flow meter; providing, by the return inlet, a return inlet flow to the flow rate measurement module; measuring, by the return flow meter, a return flow rate of the return inlet flow; receiving, by the return outlet, a return outlet flow from the return flow meter; and calculating, by the processor, the fluid consumption rate based on the supply flow rate and the return flow rate.

In some embodiments, the method further includes measuring, by the supply flow meter, the supply flow rate by rotating a first spindle engagable with a second spindle; and measuring, by the return flow meter, the return flow rate by rotating a third spindle engagable with a fourth spindle In some embodiments, the method further includes calculating, by the processor, the fluid consumption rate within a predetermined latency period.

In some embodiments, the method further includes transmitting, by the processor, the fluid consumption rate to at least one of an engine control module or an external monitor.

In some embodiments, the method further includes adjusting, after measuring the supply flow rate, a supply flow pressure using a supply flow controller; and adjusting, after measuring the return flow rate, a return flow pressure using a return flow controller.

It is to be understood that both the foregoing general description and the following detailed description are exemplary and explanatory only, and are not restrictive of the present teachings.

BRIEF DESCRIPTION OF THE DRAWINGS

The disclosure will become more fully understood from the following detailed description, taken in conjunction with the accompanying figures, wherein like reference numerals refer to like elements unless otherwise indicated, in which.

DETAILED DESCRIPTION

Figure 1:
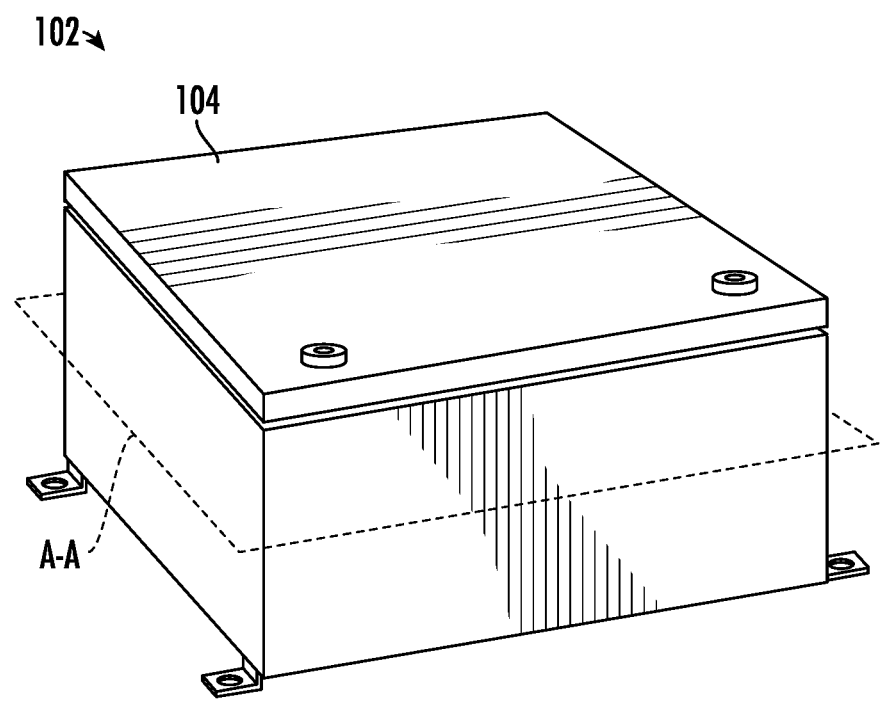
FIG. 1 is a perspective view of a flow rate measurement module of a fluid measurement system, according to an exemplary embodiment.

Following below are more detailed descriptions of various concepts related to, and implementations of, methods, apparatuses, and for providing a flow rate measurement module for a fluid measurement system. The various concepts introduced above and discussed in greater detail below may be implemented in any of a number of ways, as the described concepts are not limited to any particular manner of implementation. Examples of specific implementations and applications are provided primarily for illustrative purposes.

I. Overview

The exemplary non-limiting techniques of the present disclosure account for potential contributors to having a measured or calculated fuel consumption rate that differs from an actual fuel consumption rate, such as environmental conditions and vehicle hardware conditions. More accurate fluid consumption rates are achievable in some circumstances using engine speed, predicted torque, time data, and fuel consumption maps recorded under specific conditions for a specific engine.

Implementations described herein are related to a fluid measurement system configured to measure fluid consumption of a vehicle. The fluid measurement system includes a housing coupled to the vehicle. The housing includes a supply inlet, a supply outlet, a return inlet, and a return outlet. The fluid measurement system also includes a flow rate measurement module. The flow rate measurement module includes a plurality of flow meters disposed within the housing. The plurality of flow meters includes a supply flow meter configured to measure a supply flow rate and disposed between the supply inlet and the supply outlet, and a return flow meter configured to measure a return flow rate and disposed between the return inlet and the return outlet. The flow rate measurement module also includes a processor disposed within the housing and configured to receive the supply flow rate from the supply flow meter, receive the return flow rate from the return flow meter, calculate, using the supply flow rate and the return flow rate, a fluid consumption rate, and transmit the fluid consumption rate.

II. Fluid Measurement Systems

The present application provides for at least one exemplary embodiment of a fluid measurement system 100 which is configured to measure fluid consumption of a vehicle (e.g., passenger vehicle, commercial vehicle, construction equipment, etc.) using a flow rate measurement module 102. Although the following discussion describes embodiments of the fluid measurement system 100 as it relates to measuring fuel consumption of the vehicle, the fluid measurement system 100 is not limited to measuring fuel consumption of a vehicle. The fluid measurement system 100 is configured to measure flow rates of other fluids (e.g., reductant, diesel exhaust fluid, etc.) of a vehicle. Further, the fluid measurement system 100 is configured to measure fuel consumption of a variety of fuels, e.g., gas fuel, diesel, biodiesel, hydrogen, ammonia, etc.

The fluid measurement system 100 includes a housing 104 and a flow rate measurement module 102 disposed within the housing 104. The flow rate measurement module 102 includes a plurality of flow meters 110, 124 and a processor 134. Accordingly, the fluid measurement system 100 includes a housing 104, a plurality of flow meters 110, 124, and a processor 134.

As explained in more detail herein, the fluid measurement system 100 allows for real time measurement of a supply flow rate and a return flow rate to calculate a fluid consumption rate. Such exemplary embodiments are particularly advantageous as they may yield more accurate information by measuring the actual fluid consumption rate under operating conditions compared to systems that predict the fluid consumption rate analytically based on engine test cell data.

Referring to the Figures generally, FIGS. 1-7 depict the flow rate measurement module 102 of the fluid measurement system 100. More particularly, as described below, FIGS. 1-7 collectively show a flow rate measurement module 102 for a fluid measurement system 100. The flow rate measurement module 102 includes a supply flow meter 110, a return flow meter 124, and a processor 134. The supply flow meter 110 is configured to receive a supply inlet flow; measure a supply flow rate; and provide a supply outlet flow. The return flow meter 124 is configured to receive a return inlet flow; measure a return flow rate; and provide a return outlet flow. The processor 134 is coupled to the supply flow meter 110 and the return flow meter 124, and is configured to determine, from the supply flow meter 110, the supply flow rate; determine, from the return flow meter 124, the return flow rate; and determine a fluid consumption rate based on the supply flow rate and the return flow rate.

In some embodiments, a fluid measurement system 100 is configured to measure fluid consumption of a vehicle. The fluid measurement system 100 includes a housing 104 coupled to the vehicle. The housing 104 includes a supply inlet 106, a supply outlet 118, a return inlet 120, and a return outlet 132. A plurality of flow meters is disposed within the housing 104. The plurality of flow meters 110, 124 include a supply flow meter 110 configured to measure a supply flow rate and disposed between the supply inlet 106 and the supply outlet 118; and a return flow meter 124 configured to measure a return flow rate and disposed between the return inlet 120 and the return outlet 132. The fluid measurement system 100 further includes a processor 134 configured to communicate with at least the supply flow meter 110 and the return flow meter 124; calculate, based on the supply flow rate and the return flow rate, a fluid consumption rate; and transmit the fluid consumption rate during operation of the vehicle.

FIG. 1 depicts a perspective view of the flow rate measurement module 102 of the fluid measurement system 100, according to an exemplary embodiment. In an exemplary embodiment, the fluid measurement system 100 includes a housing 104. The housing 104 (e.g., enclosure, compartment, etc.) is coupled (e.g., attached, fixed, welded, fastened, riveted, adhesively attached, bonded, pinned, etc.) to the vehicle and encloses the flow rate measurement module 102. In some embodiments, the housing 104 is a weatherproof, ruggedized enclosure designed to withstand shock and vibration associated with vehicle operations in normal or harsh environments.

Figure 2:
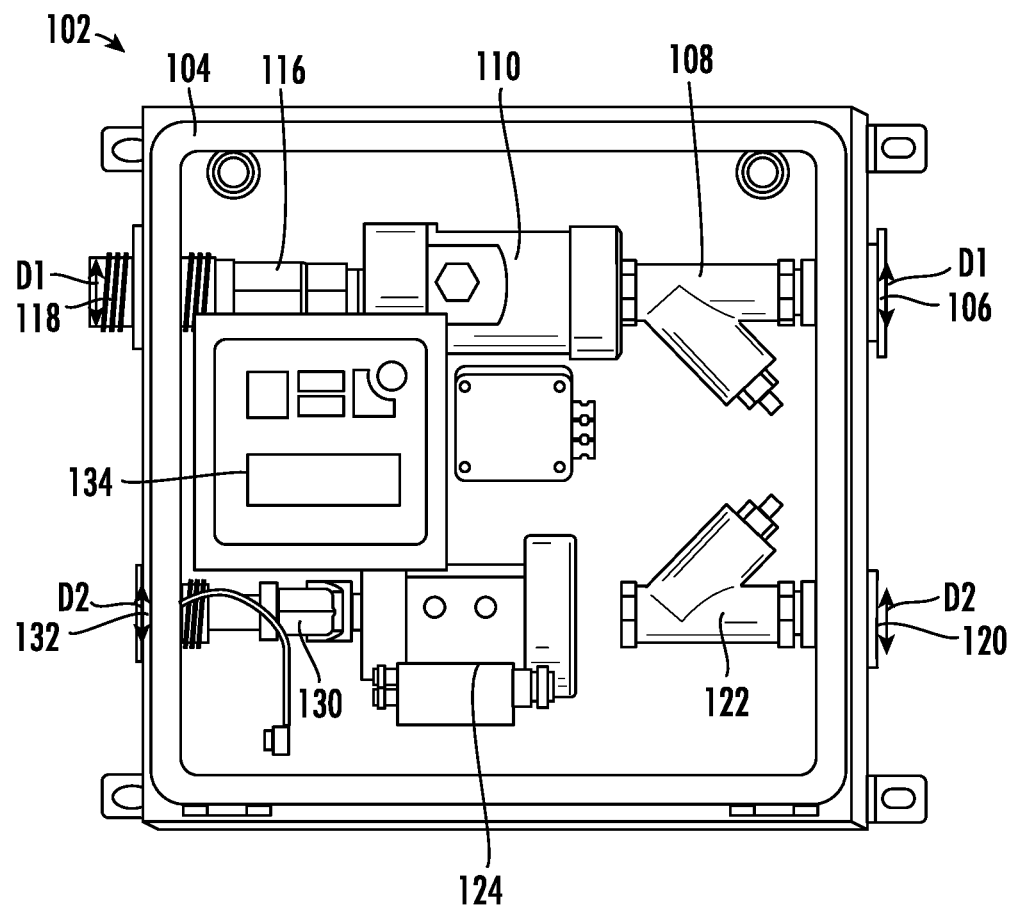
FIG. 2 is a cross-sectional top view of the flow rate measurement module taken along a Plane A-A of FIG. 1, according to an exemplary embodiment.
Figure 3:
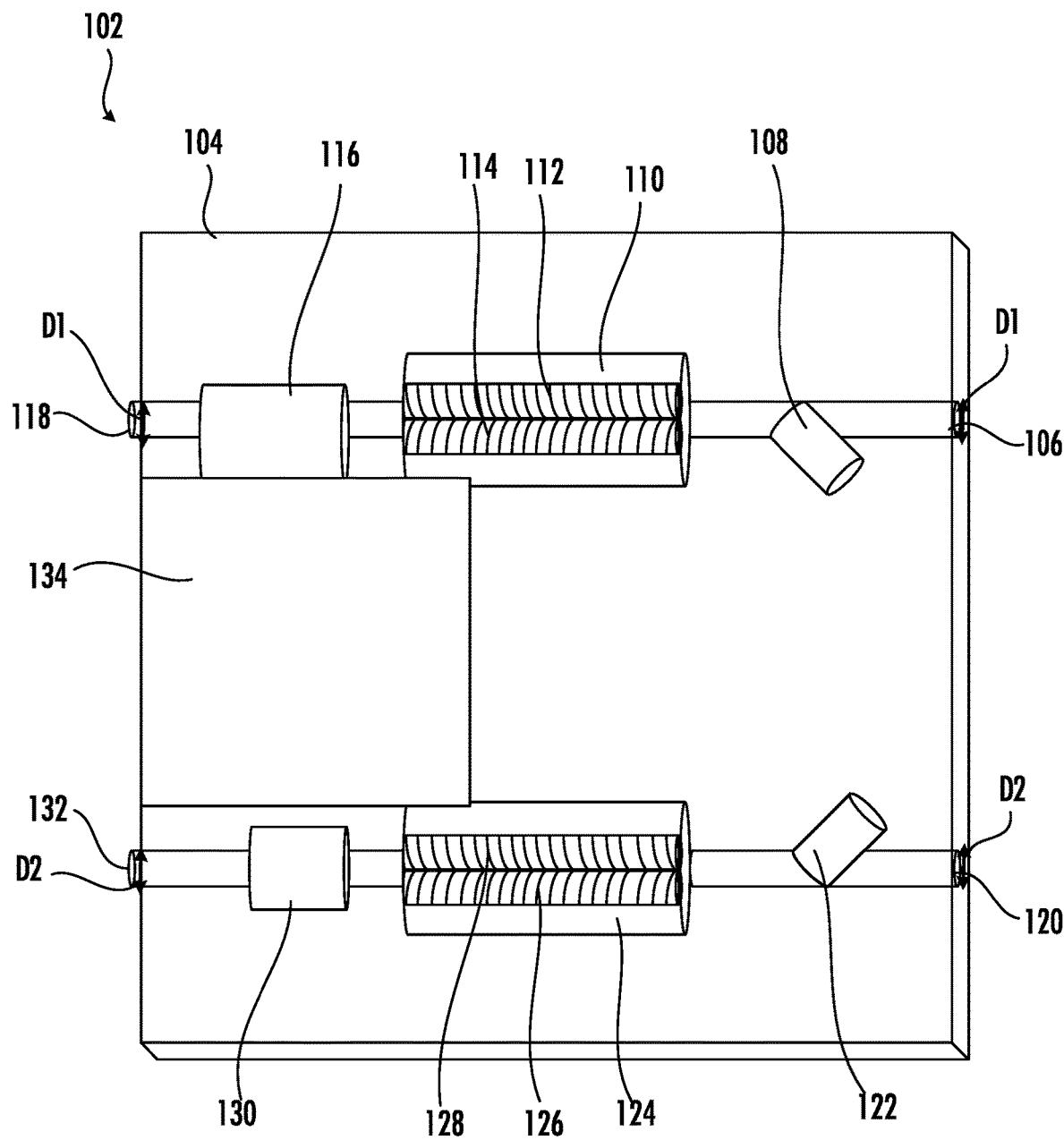
FIG. 3 is a cross-sectional top view of Detail A of the flow rate measurement module taken along the Plane A-A of FIG. 1, according to an exemplary embodiment.
Figure 4:
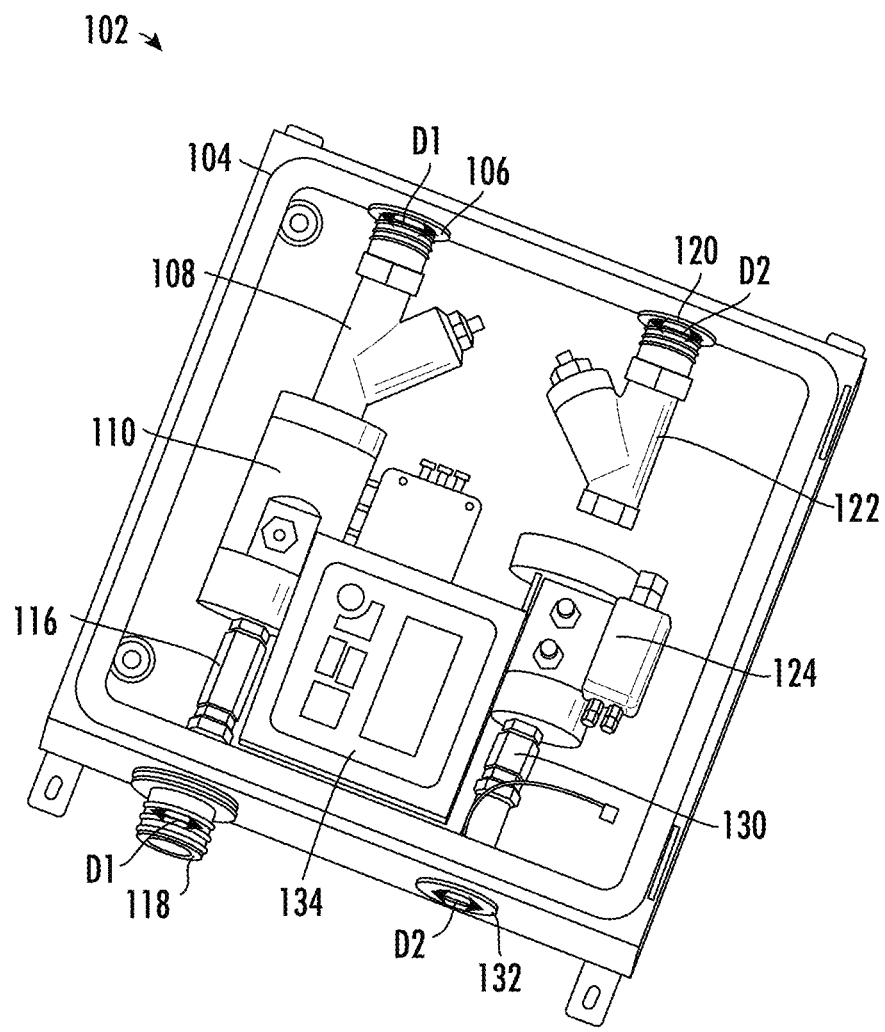
FIG. 4 is an additional cross-sectional top view of the flow rate measurement module taken along the Plane A-A of FIG. 1, according to an exemplary embodiment.
Figure 5:
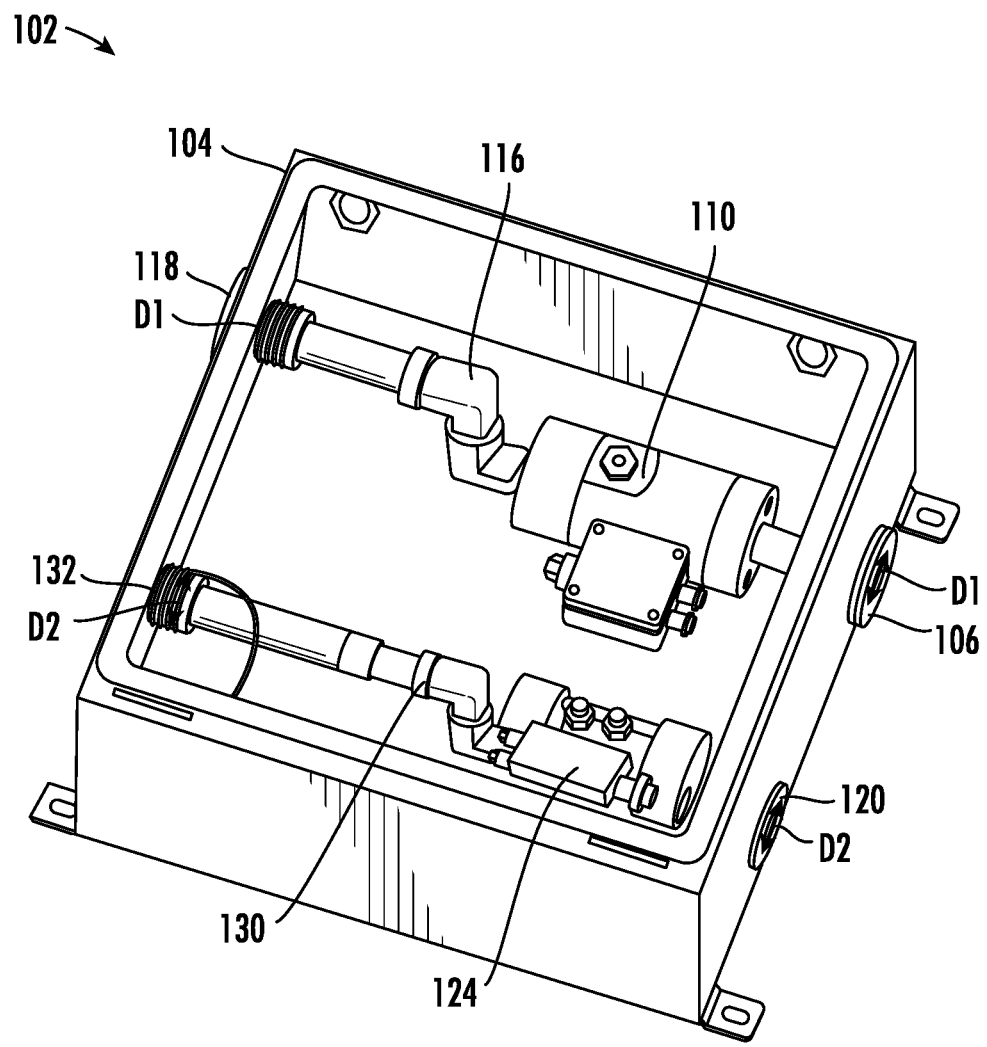
FIG. 5 is a cross-sectional perspective view of the flow rate measurement module taken along the Plane A-A of FIG. 1 without showing a processor, a supply inlet flow filter, and a return inlet flow filter, according to an exemplary embodiment.
Figure 6:
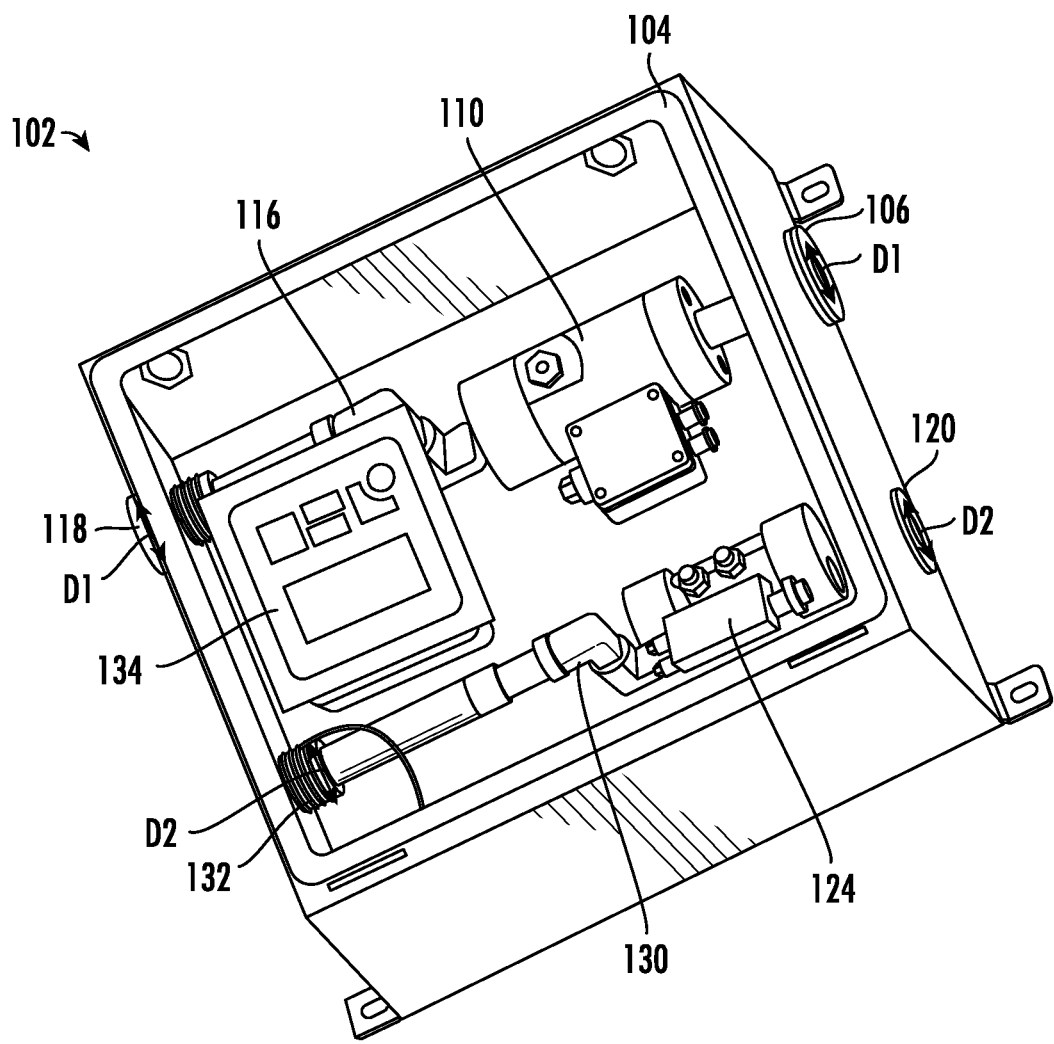
FIG. 6 is an additional cross-sectional perspective view of the flow rate measurement module taken along the Plane A-A of FIG. 1 without showing a supply inlet flow filter and a return inlet flow filter, according to an exemplary embodiment.

FIGS. 2 and 4 depict cross-sectional top views of the flow rate measurement module 102 taken along the Plane A-A of FIG. 1, according to exemplary embodiments. FIG. 3 depicts a cross-sectional top view of Detail A of the flow rate measurement module 102 taken along the Plane A-A of FIG. 1, according to an exemplary embodiment. FIGS. 5 and 6 depict cross-sectional top views of the flow rate measurement module 102 taken along the Plane A-A of FIG. 1, according to exemplary embodiments.

Referring to FIGS. 2-6, in some embodiments, the housing 104 includes a supply inlet 106 (e.g., port, opening, threaded pipe, etc.). The supply inlet 106 is configured to provide a supply inlet flow (e.g., of fluid such as fuel) to the flow rate measurement module 102. The supply inlet 106 has a first diameter D1. The supply inlet 106 is configured such that the first diameter D1 is dimensioned according to an engine minimum fuel flow rate and an engine maximum fuel flow rate. In some embodiments, the supply inlet 106 is configured to detect a supply inlet flow pressure using a pressure sensor.

Referring to FIGS. 2-4, in some embodiments, the flow rate measurement module 102 includes a supply inlet flow filter 108 (e.g., filter, screen, etc.). The supply inlet flow filter 108 is fluidly coupled to the supply inlet 106 and is configured to filter the supply inlet flow before the supply inlet flow reaches downstream components. In some embodiments, the supply inlet flow filter 108 is a 100 micron flow screen, but is not limited to this sizing. In other embodiments, the supply inlet flow filter 108 comprises a plurality of screens, including, for example, screens of different sizes or the same size.

Referring to FIGS. 2-6, the flow rate measurement module 102 includes a supply flow meter 110 (e.g., flow meter, etc.). The supply flow meter 110 is fluidly coupled to and downstream of the supply inlet flow filter 108. In this way, the supply inlet flow filter 108 is configured to inhibit or reduce infiltration of solids to the supply flow meter 110 and can facilitate prolonged operation of or reduce maintenance needs for the supply flow meter 110. The supply flow meter 110 is configured to receive the supply inlet flow from the supply inlet flow filter 108 and measure a supply flow rate of the supply inlet flow.

Referring to FIG. 3, which depicts a cross-sectional top view of Detail A, in some embodiments, the supply flow meter 110 measures the supply flow rate using a screw-type flow meter. A screw-type flow meter is an example of a positive displacement flow meter employing spindles with threaded profiles that are configured to engage with each other. Such spindles are disposed in a housing and are configured such that liquid flowing therethrough causes the spindles to rotate. During such rotation, self-contained part volumes are formed which are continuously filled and discharged. Sensing equipment provided with the spindles, such as a sensor and an encoder, allow for the flow to be measured.

For example, as shown in FIG. 3, in some embodiments, the supply inlet flow passes through the supply flow meter 110 and rotates a portion of the supply flow meter 110. In some embodiments, the supply flow meter 110 comprises a first spindle 112 and a second spindle. The first spindle 112 is configured to engage with the second spindle 114, and the second spindle 114 is configured to engage with the first spindle 112. The first spindle 112 and the second spindle 114 are configured to rotate to measure the supply flow rate. In some embodiments, the first spindle 112 and the second spindle 114 are each threaded such as to engage with one another. As the supply inlet flow passes through the supply flow meter 110, the supply inlet flow causes the first spindle 112 and the second spindle 114 to rotate. The rotation of the first spindle 112 and the second spindle 114 is measured by the supply flow meter 110 to determine the supply flow rate.

In some embodiments, the supply flow meter 110 measures the supply flow rate using a volumetric flow meter. For example, the supply flow meter 110 is configured to measure the supply flow rate by measuring a volume of the supply inlet flow flowing through the supply flow meter 110. For example, as the supply inlet flow passes through the supply flow meter 110, the supply flow meter 110 measures a volume of the supply inlet flow flowing through the supply flow meter 110 to determine the supply flow rate. After measuring the supply flow rate, the supply flow meter 110 provides the supply inlet flow as a supply outlet flow (e.g., of fuel, of reductant, etc.) to downstream components.

Referring to FIGS. 2-6, in some embodiments, the flow rate measurement module 102 includes a supply flow controller 116. In FIGS. 2-6, the supply flow controller 116 is a valve, such as an electromagnetically actuated valve such as a solenoid valve. In some embodiments, the supply flow controller 116 may be e.g., a pulse width modulated (PWM) controller, or an actuator. The supply flow controller 116 is fluidly coupled to the supply flow meter 110 such as to receive the supply outlet flow from the supply flow meter 110. The supply flow controller 116 is configured to control a supply outlet flow pressure. In this way, the supply outlet flow is pressurized to optimize engine performance.

Referring to FIGS. 2-6, the housing 104 includes a supply outlet 118 (e.g., port, opening, threaded pipe, etc.). The supply outlet 118 is configured to receive the supply outlet flow from the supply flow controller 116. In some embodiments, the supply outlet 118 also has the first diameter D1. As previously described, the supply inlet 106 is configured such that the first diameter D1 is dimensioned according to the engine minimum fuel flow rate and the engine maximum fuel flow rate.

Referring to FIGS. 2-6, the housing 104 includes a return inlet 120 (e.g., port, opening, threaded pipe, etc.). The return inlet 120 is configured to provide a return inlet flow (e.g., of fluid such as fuel) to the flow rate measurement module 102. In some embodiments, the supply flow meter 110 and the return flow meter 124 are respectively dimensioned to measure flow having a flow rate in a range from an engine minimum fuel flow rate to an engine maximum fuel flow rate. For example, as shown in FIGS. 2-6, the return inlet 120 has a second diameter D2. The return inlet 120 is configured such that the second diameter D2 is dimensioned according to the engine minimum fuel flow rate and the engine maximum fuel flow rate. In some embodiments, the return inlet 120 is configured to detect a return inlet flow pressure using a pressure sensor.

In some embodiments, the flow rate measurement module 102 includes both (i) a supply inlet flow filter 108 disposed between the supply inlet 106 and the supply flow meter 110 and configured to filter particulate from the supply inlet flow, and (ii) a return inlet flow filter 122 disposed between the return inlet 120 and the return flow meter 124 and configured to filter particulate from the return inlet flow. In some embodiments, the supply inlet flow filter 108 has a first screen and the return inlet flow filter 122 has a second screen that is a same size as the first screen. In some embodiments, the supply inlet flow filter 108 has a first screen and the return inlet flow filter 122 has a second screen that are disposed, respectively, between the supply flow meter 110 and the return flow meter 124 and a first end of the housing 104.

For example, referring to FIGS. 2-4, in some embodiments, the flow rate measurement module 102 includes a supply inlet flow filter 108 (e.g., a filter, screen etc.) between the supply flow meter 110 and a first end of the housing 104 and a return inlet flow filter 122 (e.g., filter, screen, etc.) between the return flow meter 124 and the first end of the housing 104. The return inlet flow filter 122 is fluidly coupled to the return inlet 120 and is configured to filter the return inlet flow before the return inlet flow reaches downstream components. In some embodiments, the return inlet flow filter 122 is a 100 micron flow screen, but is not limited to this sizing. In some embodiments, the supply inlet flow filter 108 and the return inlet flow filter 122 are equal in size to each other. In some embodiments, the respective sizes of the supply inlet flow filter 108 and the return inlet flow filter 122 may differ.

Referring to FIGS. 2-6, the flow rate measurement module 102 includes a return flow meter 124 (e.g., flow meter, etc.). The return flow meter 124 is fluidly coupled to and downstream of the return inlet flow filter 122. In this way, the return inlet flow filter 122 is configured to inhibit or prevent the transmission of solids to the return flow meter 124 and can contribute to prolonging the operation of or reducing maintenance needs for the return flow meter 124. The return flow meter 124 is configured to receive the return inlet flow from the return inlet flow filter 122 and measure a return flow rate of the return inlet flow.

Referring to FIG. 3, which depicts a cross-sectional top view of Detail A, in some embodiments, the return flow meter 124 measures the return flow rate using a screw-type flow meter. In some embodiments, the return inlet flow passes through the return flow meter 124 and rotates a portion of the return flow meter 124. In some embodiments, the return flow meter 124 comprises a third spindle 126 and a fourth spindle 128. The third spindle 126 is configured to engage with the fourth spindle 128, and the fourth spindle 128 is configured to engage with the third spindle 126. The third spindle 126 and the fourth spindle 128 are configured to rotate to measure the supply flow rate. In some embodiments, the third spindle 126 and the fourth spindle 128 are each threaded such as to engage with one another. As the return inlet flow passes through the return flow meter 124, the return inlet flow causes the third spindle 126 and the fourth spindle 128 to rotate. The rotation of the third spindle 126 and the fourth spindle 128 is measured by the return flow meter 124 to determine the return flow rate.

In some embodiments, the return flow meter 124 measures the return flow rate using a volumetric flow meter. The return flow meter 124 is configured to measure the return flow rate by measuring a volume of the return inlet flow flowing through the return flow meter 124. For example, as the return inlet flow passes through the return flow meter 124, the return flow meter 124 measures a volume of the return inlet flow flowing through the return flow meter 124 to determine the return flow rate. After measuring the return flow rate, the return flow meter 124 provides the return inlet flow as a return outlet flow (e.g., of fluid such as fuel) to downstream components.

Referring to FIGS. 2-6, in some embodiments, the flow rate measurement module 102 includes a return flow controller 130 in addition to the supply flow controller 116. In particular, the flow rate measurement module 102 includes the supply flow controller 116 configured to control the supply outlet flow pressure and a return flow controller 130 configured to control a return outlet flow pressure. In some embodiments, both the supply flow controller 116 and the return flow controller 130 are solenoid valves. In some embodiments, the flow rate measurement module 102 includes the supply flow controller 116 disposed between the supply flow meter 110 and the supply outlet 118; and a return flow controller 130 disposed between the return flow meter 124 and the return outlet 132, the supply flow controller 116 and the return flow controller 130 being coupled to the processor 134 to control, respectively, a supply flow pressure and a return flow pressure.

In FIGS. 2-6, the return flow controller 130 is shown as a valve, such as an electromagnetically actuated valve. In some embodiments, the return flow controller 130 may be, e.g., a pulse width modulated (PWM) controller or an actuator. The return flow controller 130 is fluidly coupled to the return flow meter 124 and receives the return outlet flow from the return flow meter 124. The return flow controller 130 is configured to control a return outlet flow pressure. In this way, the return outlet flow pressure is adjustable before exiting the flow rate measurement module 102. In some embodiments, the supply flow controller 116 and return flow controller 130 are integrated in a single controller.

Referring to FIGS. 2-6, various components according to some embodiments may have particular dimensions with respect to other components. For example, the supply inlet 106 and the supply outlet 118 are dimensioned to have a first diameter, the return inlet 120 and a return outlet 132 are dimensioned to have a second diameter, and the first diameter and the second diameter respectively dimensioned according to an engine minimum fuel flow rate and an engine maximum fuel flow rate. For example, as shown in FIGS. 2-6, the housing 104 includes a return outlet 132 (e.g., port, opening, threaded pipe, etc.). The return outlet 132 is configured to receive the return outlet flow from the return flow controller 130. In some embodiments, the return outlet 132 also has the second diameter D2. As previously described, the return inlet 120 is configured such that the second diameter D2 is dimensioned according to the engine minimum fuel flow rate and the engine maximum fuel flow rate.

Referring to FIGS. 2-4, in some embodiments, the flow rate measurement module 102 includes a processor 134 (e.g., ECU, computer, etc.). The processor 134 is electrically coupled to the supply flow meter 110 and the return flow meter 124. The processor 134 is configured to receive the supply flow rate and the return flow rate from the supply flow meter 110 and the return flow meter 124, respectively, and calculate the fluid consumption rate based on the supply flow rate and the return flow rate. In some embodiments, the processor 134 is disposed between the supply flow meter 110 and the return flow meter 124. The flow rate measurement module 102 determines the fluid consumption rate substantially in real time. More particularly, the processor 134 calculates the fluid consumption rate within a predetermined period. For example, the processor 134 calculates the fluid consumption rate in a range of about 5 milliseconds (ms) to about 10 ms, inclusive. In some embodiments, the processor 134 calculates the fluid consumption rate in about 4 ms, about 5 ms, about 7 ms, about 10 ms, about 11 ms, or about 15 ms, etc.). In some embodiments, the processor 134 is configured to calculate the fluid consumption rate within a latency period of about 8 ms to about 15 ms or about 15 ms to about 25 ms from when at least one of the supply flow rate or the return flow rate are determined (e.g., from a time when the later one of the supply flow rate or the return flow rate is determined).

In some embodiments, the processor 134 is electrically coupled to the supply flow controller 116 and the return flow controller 130. In this way, the processor 134 is configured to provide the supply flow rate and the return flow rate to the supply flow controller 116 and the return flow controller 130, respectively. The supply flow controller 116 is configured to receive the supply flow rate and adjust, based on the supply flow rate, the supply outlet flow pressure. Similarly, the return flow controller 130 is configured to receive the return flow rate and adjust, based on the return flow rate, the return outlet flow pressure.

Figure 7:
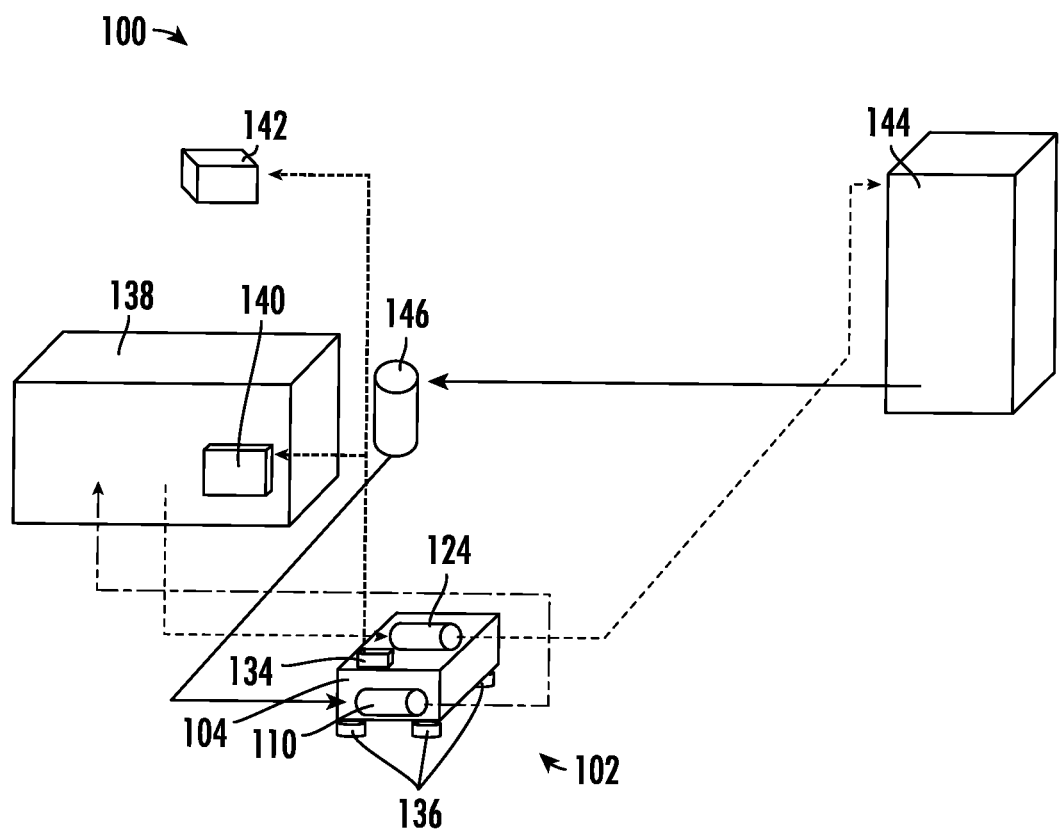
FIG. 7 is a schematic diagram of an example fluid measurement system including the flow rate measurement module, an engine, a fluid source, and a fluid filter, according to an exemplary embodiment.

FIG. 7 is a schematic diagram of the fluid measurement system 100, according to an exemplary embodiment. Referring to FIG. 7, the flow rate measurement module 102 includes one or more vibration isolators 136. The one or more vibration isolators 136 are coupled to the housing 104 and are configured to reduce vibration of the flow rate measurement module 102 during operation.

Referring to FIG. 7, in some embodiments, the fluid measurement system 100 includes an engine 138 (e.g., internal combustion engine, etc.). The flow rate measurement module 102 provides the supply outlet flow to the engine 138 and receives the return inlet flow from the engine 138.

Referring to FIG. 7, in some embodiments, the processor 134 is configured to transmit the fluid consumption rate. Such transmission may be to at least one of an engine control module 140 or an external monitor 142. For example, the processor 134 transmits the fluid consumption rate to at least one of an engine control module 140 configured to monitor the fluid consumption rate, and an external monitor 142 configured to display the fluid consumption rate. For example, the fluid measurement system 100 also is configured to communicate with or be integrated with the engine control module 140 (e.g., ECM, engine control unit (ECU), computer, etc.) coupled to the engine 138. In some embodiments, the processor 134 is configured to transmit the fluid consumption rate to the engine control module 140.

Referring back to FIGS. 2-6, in some embodiments, the processor 134 includes a processing circuit and a memory and is configured to calculate a fluid consumption rate as the difference between the supply flow rate and the return flow rate, and to cause to be transmitted data including the fluid consumption rate. As described herein and amongst other uses, such circuitry facilitates performance of certain operations to enable reception and transmission of data.

For example, the circuitry may provide an instruction (e.g., command, etc.) to, e.g., transmit or receive data with respect to an engine control module 140 of the engine 138. In this regard, the circuitry may include programmable logic that defines the frequency of acquisition of the data and/or other aspects of the transmission of the data. In particular, the circuitry may be implemented by computer readable media which may include code written in any programming language including, but not limited to, Java, JavaScript, Python or the like and any conventional procedural programming languages, such as the "C" programming language or similar programming languages. The processor 134 may be configured to communicate with one or more remote processors. In the latter scenario, the remote processors may be connected to each other through any type of network (e.g., a CAN bus, etc.). The memory (e.g., RAM, ROM, Flash Memory, hard disk storage, etc.) may store data and/or computer code for facilitating the various processes described herein. The memory may be communicably connected to the processing circuitry to provide computer code or instructions for executing at least some of the processes described herein. The memory may be or include tangible, non-transient volatile memory or non-volatile memory and may include database components, object code components, script components, or any other type of information structure for supporting the various activities and information structures described herein.

Referring to FIG. 7, in some embodiments, the engine control module 140 is configured to monitor the fluid consumption rate and control the engine 138 based, at least in part, on the fluid consumption rate provided by the processor 134. In some embodiments, the fluid measurement system 100 includes or is configured to communicate with the external monitor 142 (e.g., display, screen, monitor, touch screen, heads up display (HUD), etc.). The processor 134 is configured to transmit the fluid consumption rate to the external monitor 142, which is configured to display, in part, the fluid consumption rate. In some embodiments, the external monitor 142 is configured to provide remote monitoring and control of the fluid measurement system 100. In some embodiments, the engine control module 140 and the external monitor 142 are in communication with one another. In this way, the external monitor 142 also is configured to display data from the engine control module 140.

Referring to FIG. 7, in some embodiments, the supply inlet 106 receives the supply inlet flow from the fluid source 144; the supply outlet 118 provides the supply outlet flow to the engine 138; the return inlet 120 receives the return inlet flow from the engine 138; and the return outlet 132 provides the return outlet flow to the fluid source 144. For example, in some embodiments, the fluid measurement system 100 includes the fluid source 144 (e.g., tank, fuel tank, reductant tank, diesel exhaust fluid tank, etc.). The fluid source 144 is configured to contain fluid of the fluid measurement system 100. The fluid source 144 is fluidly coupled to the flow rate measurement module 102. The fluid source 144 is configured to provide the supply inlet flow to the flow rate measurement module 102 and receive the return outlet flow from the flow rate measurement module 102. In some embodiments, the fluid measurement system 100 includes a fluid filter 146 (e.g., filter, screen, reductant filter, DEF filter, etc.). The fluid filter 146 is fluidly coupled to and disposed between the fluid source 144 and the flow rate measurement module 102. The fluid filter 146 is configured to inhibit or reduce infiltration of solids to the flow rate measurement module 102 and can contribute to prolonging the operation of or reducing maintenance needs for the flow rate measurement module 102.

III. Methods of Calculating Fluid Consumption Rate

Figure 8:
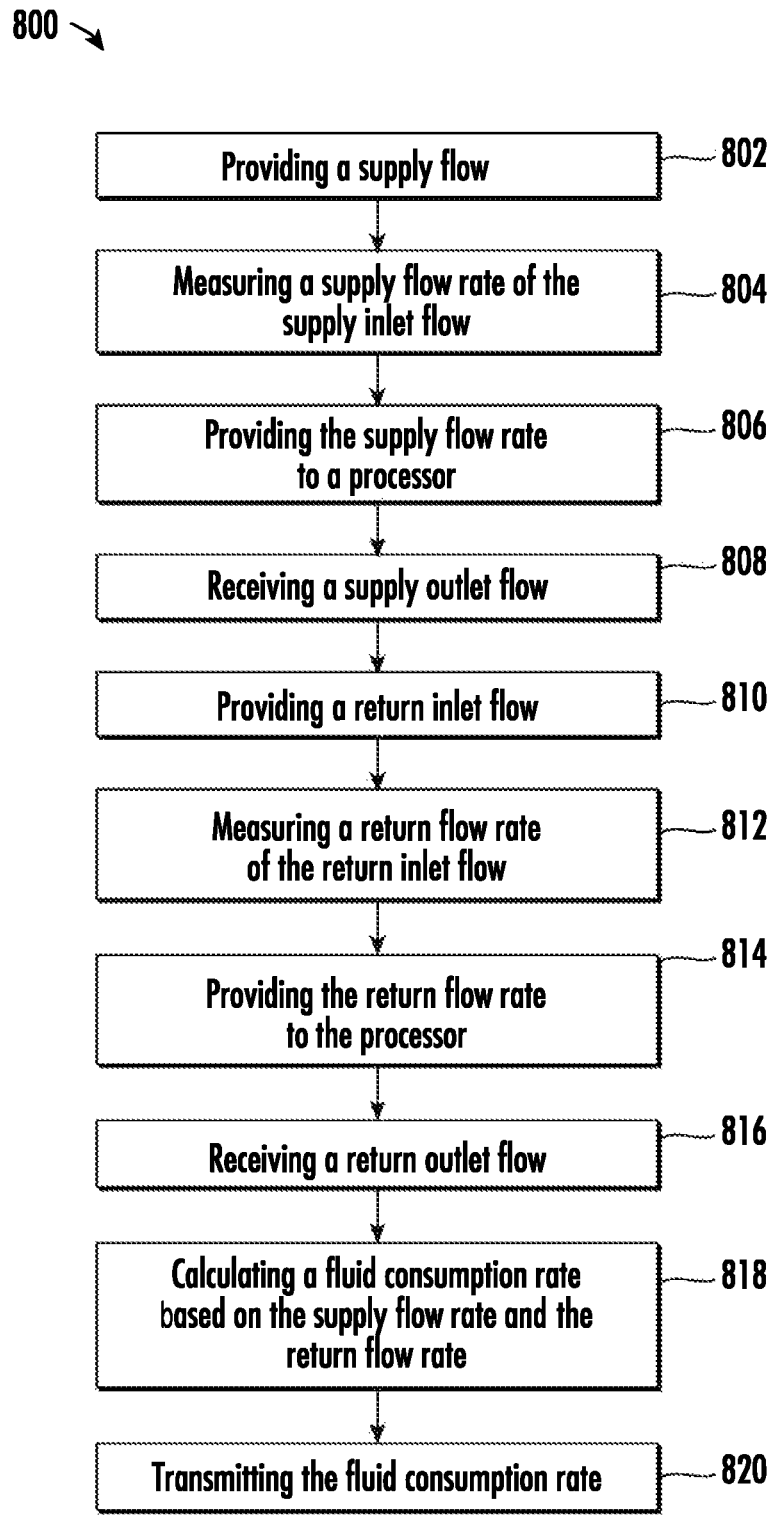
FIG. 8 is a flowchart illustrating a method of calculating a fluid consumption rate using the flow rate measurement module of the fluid measurement system, according to an exemplary embodiment.

FIG. 8 illustrates a method 800 (e.g., process, etc.) of calculating the fluid consumption rate of the vehicle using the flow rate measurement module 102 of the fluid measurement system 100. The operations described below are exemplary and non-limiting, and include optional operations which may be omitted in some embodiments. The method 800 for calculating a fluid consumption rate of a vehicle using a flow rate measurement module 102 of a fluid measurement system 100 is provided. The fluid measurement system 100 includes a housing 104 provided with a supply inlet 106, a supply outlet 118, a return inlet 120, and a return outlet 132; and a flow rate measurement module 102 having a plurality of flow meters with at least a supply flow meter 110 and a return flow meter 124, and a processor 134. The method 800 includes providing, by the supply inlet 106, a supply inlet flow to the flow rate measurement module 102; measuring, by the supply flow meter 110, a supply flow rate; receiving, by the supply outlet 118, a supply outlet flow from the supply flow meter 110; providing, by the return inlet 120, a return inlet flow to the flow rate measurement module 102; measuring, by the return flow meter 124, a return flow rate of the return inlet flow; receiving, by the return outlet 132, a return outlet flow from the return flow meter 124; and calculating, by the processor 134, the fluid consumption rate using the supply flow rate and the return flow rate.

The method 800 begins in step 802 by providing the supply inlet flow. The supply inlet 106 provides the supply inlet flow to the flow rate measurement module 102. For example, fluid is supplied from the fluid source 144 via the supply inlet 106 to the flow rate measurement module 102. The supply flow rate of the supply inlet flow can thus be calculated by the supply flow meter 110.

The method 800 optionally includes filtering the supply inlet flow. In some embodiments, the supply inlet flow is filtered by the fluid filter 146 before the supply inlet flow is provided to the flow rate measurement module 102. Further, the method 800 optionally includes filtering the supply inlet flow by the supply inlet flow filter 108. Thus, the supply inlet flow filter 108 filters the supply inlet flow before the supply inlet flow reaches the supply flow meter 110. The supply inlet flow filter 108 is configured to inhibit or reduce infiltration of solids to the supply flow meter 110.

The method 800 further includes, in step 804, measuring the supply flow rate. The supply flow rate measured by the supply flow meter 110 is usable to determine the fluid consumption rate. In some embodiments, the supply flow meter 110 measures the supply flow rate by rotating the first spindle 112 engaged with the second spindle 114. For example, the first spindle 112 and the second spindle 114 are rotatable to yield the supply flow rate as described above in connection with FIG. 3.

The method 800 further includes, in step 806, providing the supply flow rate to the processor 134. The processor 134 uses the supply flow rate provided by the supply flow meter 110 to calculate the fluid consumption rate in connection with a measurement of the return flow rate as discussed further herein.

The method 800 optionally includes adjusting flow pressure. For example, the method 800 optionally includes adjusting, after measuring the supply flow rate, the supply flow pressure using the supply flow controller 116; and adjusting, after measuring the return flow rate, the return flow pressure using the return flow controller 130. The supply flow controller 116 is configured to adjust the supply flow pressure after the supply flow meter 110 measures the supply flow rate. In particular, the supply flow pressure is adjustable before reaching the engine 138.

The method 800 further includes, in step 808, receiving a supply outlet flow. The supply outlet 118 receives the supply outlet flow from the supply flow controller 116 or the supply flow meter 110. The supply outlet 118 is configured to supply the supply outlet flow to the engine 138.

The method 800 further includes, in step 810, providing the return inlet flow. The return inlet 120 provides the return inlet flow to the flow rate measurement module 102. For example, the return inlet flow is supplied from the engine 138 via the return inlet 120 to the flow rate measurement module 102. The return flow rate of the return inlet flow can thus be calculated by the return flow meter 124.

The method 800 further includes optionally filtering the return inlet flow. Thus, the return inlet flow filter 122 filters the return inlet flow before the return inlet flow reaches the return flow meter 124. The return inlet flow filter 122 is configured to inhibit or reduce infiltration of solids to the return flow meter 124.

The method 800 continues in step 812 by measuring the return flow rate of the return inlet flow. For example, the method includes, in addition to measuring, by the supply flow meter 110, the supply flow rate by rotating a first spindle 112 engagable with a second spindle 114, additionally measuring, by the return flow meter 124, the return flow rate by rotating a third spindle 126 engagable with a fourth spindle 128 as described above in connection with FIG. 3.

The method 800 continues in step 814 by providing the return flow rate to the processor 134. The processor 134 is configured to use the return flow rate measured by the return flow meter 124 with the supply flow rate from the supply flow meter 110 to calculate the fluid consumption rate. Namely, in some embodiments, the processor 134 is configured to calculate the fluid consumption rate as the supply flow rate less the return flow rate.

The method 800 further includes optionally adjusting flow pressure. For example, the method 800 optionally includes adjusting, after measuring the supply flow rate, the supply flow pressure using the supply flow controller 116;

and adjusting, after measuring the return flow rate, the return flow pressure using the return flow controller 130. The return flow controller 130 is configured to adjust the return flow pressure after the return flow meter 124 measures the return flow rate. The return flow pressure is adjustable before returning to the fluid source 144.

The method 800 continues in step 816 by receiving the return outlet flow. The return outlet 132 receives the return outlet flow from the return flow controller 130 or the return flow meter 124. The return outlet 132 is configured to supply the return outlet flow to the fluid source 144.

The method 800 continues in step 818 by calculating the fluid consumption rate. The processor 134 calculates the fluid consumption rate based on the supply flow rate and the return flow rate. In some embodiments, the processor 134 calculates the fluid consumption rate within a time period in a range of about 5 ms to about 10 ms, inclusive. In particular, the processor 134 is configured to calculate the fluid consumption rate in the above-noted range and further within a given time period, e.g., from about 8 ms to about 15 ms or from about 15 ms to about 25 ms, from when the supply flow rate of the supply flow meter 110 and the return flow rate of return flow meter 124 are obtained. In some embodiments, the processor 134 calculates the fluid consumption rate within a predetermined latency period. Thus, such embodiments allow the fluid consumption rate to be determined in real time, e.g., while the vehicle is in mission. Further, such embodiments allow for periodic or continuous determinations of the fluid consumption rate in real time during the course of a mission such that changes in fluid consumption rate at different points during the mission are ascertainable.

The method 800 continues in step 820 by transmitting the fluid consumption rate. In some embodiments, the processor 134 transmits the fluid consumption rate to at least one of the engine control module 140 and the external monitor 142. The engine control module 140 is configured to use the fluid consumption rate to monitor performance of the engine 138, and the external monitor 142 is configured to display the fluid consumption rate for monitoring. In some embodiments, the processor 134 is configured to transmit data including the fluid consumption rate to both of the engine control module 140 and the external monitor 142 simultaneously. In some embodiments, first, the engine control module 140 receives data including the fluid consumption rate, and then transmits the data to the external monitor 142 for display. In some embodiments, the engine control module 140 may calculate an adjusted fluid consumption rate based on the data including the fluid consumption rate received from the processor 134 and one or more parameters, e.g., temperature, incline, altitude, etc.

The method 800 is not limited to the order of the steps of the exemplary embodiment described above. For example, in some embodiments, in the event that the supply inlet flow and the return inlet flow pass through the flow rate measurement module 102 at the same time, one or more of step 802 through step 810 occur simultaneously with step 812 through step 820. In some embodiments, the optional filtering of the supply inlet flow and the return inlet flow may also occur simultaneously. In some embodiments, the optional adjusting of the supply outlet flow pressure and the return outlet flow pressure may also occur simultaneously.

IV. Configuration of Example Embodiments

While this specification contains various implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, exhaust gas, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values herein are inclusive of their maximum values and minimum values unless otherwise indicated. Furthermore, a range of values does not necessarily require the inclusion of intermediate values within the range of values unless otherwise indicated.

It is important to note that the construction and arrangement of the various systems and the operations according to various techniques shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

What is claimed is:

1. A flow rate measurement module for a fluid measurement system, the flow rate measurement module comprising:
   a housing configured to be coupled to a vehicle;
   a supply flow meter disposed within the housing and configured to:
      receive a supply inlet flow;
      measure a supply flow rate; and
      provide a supply outlet flow;
   a supply inlet flow filter disposed upstream of the supply flow meter, the supply inlet flow filter configured to filter particulate from the supply inlet flow;
   a supply flow controller disposed downstream from the supply flow meter, the supply flow controller configured to control a supply outlet flow pressure of the supply outlet flow;
   a return flow meter disposed within the housing and configured to:
      receive a return inlet flow;
      measure a return flow rate; and
      provide a return outlet flow, wherein the supply flow meter and the return flow meter are both screw-type flow meters;
   a return inlet flow filter disposed upstream of the return flow meter, the return inlet flow filter configured to filter particulate from the return inlet flow;
   a return flow controller disposed downstream from the return inlet flow meter, the return flow controller configured to control a return outlet flow pressure of the return outlet flow; and
   a processor disposed within the housing and coupled to the supply flow meter and the return flow meter, the processor being configured to:
      determine, from the supply flow meter, the supply flow rate;
      determine, from the return flow meter, the return flow rate; and
      determine a fluid consumption rate based on the supply flow rate and the return flow rate.

2. The flow rate measurement module according to claim 1, wherein the processor calculates the fluid consumption rate in a range of about 5 milliseconds to about 10 milliseconds, inclusive.

3. The flow rate measurement module according to claim 1, wherein
   the supply flow meter comprises a first spindle configured to engage with a second spindle, wherein the first spindle and the second spindle are configured to rotate to measure the supply flow rate, and
   the return flow meter comprises a third spindle configured to engage with a fourth spindle, wherein the third spindle and the fourth spindle are configured to rotate to measure the return flow rate.

4. The flow rate measurement module according to claim 1, wherein the supply flow meter is configured to measure the supply flow rate by measuring a volume of the supply inlet flow flowing through the supply flow meter, and
   the return flow meter is configured to measure the return flow rate by measuring a volume of the return inlet flow flowing through the return flow meter.

5. The flow rate measurement module according to claim 1, wherein the supply flow meter and the return flow meter are each configured to measure flow having a flow rate in a range from an engine minimum fuel flow rate to an engine maximum fuel flow rate.

6. The flow rate measurement module according to claim 1, wherein the supply inlet flow filter comprises a first screen disposed upstream of the supply flow meter, and the return inlet flow filter comprises a second screen disposed upstream of the return flow meter.

7. The flow rate measurement module according to claim 1,
   wherein the supply flow controller is configured to receive the supply flow rate and adjust, based on the supply flow rate, the supply outlet flow pressure, and
   the return flow controller is configured to receive the return flow rate and adjust, based on the return flow rate, the return outlet flow pressure.

8. The flow rate measurement module according to claim 1, wherein the supply flow controller and the return flow controller are solenoid valves.

9. The flow rate measurement module according to claim 1, wherein the processor is further configured to control the supply flow controller to adjust, based on the supply flow rate, the supply outlet flow pressure.

10. The flow rate measurement module according to claim 1, wherein the housing comprises a supply inlet and a supply outlet, wherein the supply flow meter is disposed between the supply inlet and the supply outlet, and wherein the supply flow controller is disposed between the supply flow meter and the supply outlet.

11. The flow rate measurement module according to claim 1, wherein the housing comprises a supply inlet, a supply outlet, a return inlet, and a return outlet, wherein the supply flow meter is disposed between the supply inlet and the supply outlet, and the return flow meter is disposed between the return inlet and the return outlet, wherein:
   the supply inlet is configured to receive the supply inlet flow from a fluid source;
   the supply outlet is configured to supply the supply outlet flow to an engine;
   the return inlet is configured to receive the return inlet flow from the engine; and
   the return outlet is configured to supply the return outlet flow to the fluid source.

12. The flow rate measurement module according to claim 11, wherein:
   the supply flow controller is disposed between the supply flow meter and the supply outlet; and
   the return flow controller is disposed between the return flow meter and the return outlet, the supply flow controller and the return flow controller being coupled to the processor to control, respectively, a supply flow pressure and a return flow pressure.

13. The flow rate measurement module according to claim 1, wherein the processor is further configured to transmit the fluid consumption rate to at least one of an engine control module configured to monitor the fluid consumption rate, and an external monitor configured to display the fluid consumption rate.

14. The flow rate measurement module according to claim 1, further comprising a vibration isolator coupled to the housing and configured to reduce vibration transmitted through the housing.

15. The flow rate measurement module according to claim 1, wherein:
   the housing has a supply inlet and a return inlet;
   the supply inlet flow filter is disposed within the housing between the supply inlet and the supply flow meter; and
   the return inlet flow filter is disposed within the housing the return inlet and the return flow meter.

16. The flow rate measurement module according to claim 1, wherein:
   the housing has a supply outlet and a return outlet;
   the supply flow controller is disposed within the housing between the supply flow meter and the supply outlet, and
   the return flow controller is disposed within the housing between the return flow meter and the return outlet.

\* \* \* \* \*